United States Patent [19]

Rossi et al.

[11] Patent Number: 5,256,311
[45] Date of Patent: Oct. 26, 1993

[54] HYDROXYALKYLHYDROXYLAMINE OXYGEN SCAVENGER IN AQUEOUS MEDIUMS

[75] Inventors: Anthony M. Rossi, Vincentown, N.J.; Paul R. Burgmayer, Wayne, Pa.

[73] Assignee: Betz Laboratories, Inc., Trevose, Pa.

[21] Appl. No.: 675,376

[22] Filed: Mar. 26, 1991

Related U.S. Application Data

[63] Continuation-in-part of Ser. No. 369,384, Jun. 21, 1989, abandoned.

[51] Int. Cl.$^5$ .......................... C02F 1/68; C02F 1/70; C09K 15/20
[52] U.S. Cl. ..................... 210/750; 210/757; 252/188.28
[58] Field of Search .................. 252/188.28; 210/750, 210/757

[56] References Cited

U.S. PATENT DOCUMENTS

| | | | |
|---|---|---|---|
| 2,382,818 | 8/1945 | Rhodes et al. | 252/51 |
| 3,551,349 | 12/1970 | Kallfass | 252/392 |
| 3,666,754 | 5/1970 | Minami et al. | 260/240 |
| 3,843,547 | 10/1974 | Kaufman et al. | 252/184 |
| 3,977,877 | 8/1976 | Oishi | 96/76 |
| 4,067,690 | 1/1978 | Cuisia et al. | 21/2.7 R |
| 4,279,767 | 7/1981 | Muccitelli | 252/178 |
| 4,289,645 | 9/1981 | Muccitelli | 252/178 |
| 4,487,745 | 11/1984 | Weiss et al. | 422/16 |
| 4,541,932 | 9/1985 | Muccitelli | 210/750 |
| 4,626,411 | 12/1986 | Nemes et al. | 422/13 |
| 4,634,584 | 1/1987 | Grosskinsky et al. | 423/265 |
| 4,847,001 | 7/1989 | Cuisia et al. | 252/389.62 |
| 5,021,515 | 6/1991 | Cochran et al. | 252/186.25 |
| 5,128,060 | 7/1992 | Ueno et al. | 252/184 |

OTHER PUBLICATIONS

"Antioxidation of Aliphatic Hydroxylamines", Johnson, Rogers, Trappe; *Chemistry and Industry;* Sep. 26, 1953, pp. 1032-1103.

"Aliphatic Hydroxylamines Part II, Autooxidation", Johnsons, Rogers, Trappe; *Journal of the Chemical Society;* 1956, pp. 1093-1103.

Patent Abstracts of Japan, vol. 7, No. 56 (C-155) [1201], Mar. 8, 1983.

Derwent Publications No. 87-226708 [32] Oct. 7, 1987.

*Primary Examiner*—Richard D. Lovering
*Assistant Examiner*—Joseph D. Anthony
*Attorney, Agent, or Firm*—Alexander D. Ricci; Steven D. Boyd

[57] ABSTRACT

An improved oxygen scavenger for aqueous mediums is disclosed which is a hydroxyalkylhydroxylamine. The material may be catalyzed with a compound such as copper, hydroquinone, benzoquinone, 1,2-naphthoquinone-4-sulfonic acid, pyrogallol and t-butylcatechol. Hydroxyalkyl substituted hydroxalmines of the general formula HO-N-[CH$_2$—CH(OH)—R]$_2$ wherein R is H or C$_1$ to C$_{10}$ alkyl have been found to be effective oxygen scavengers for aqueous systems such as industrial water system.

10 Claims, 1 Drawing Sheet

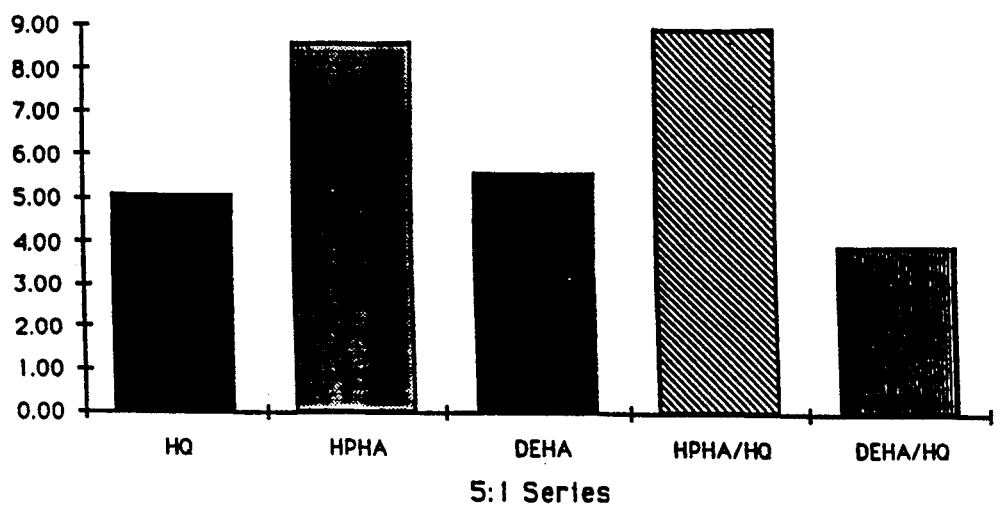
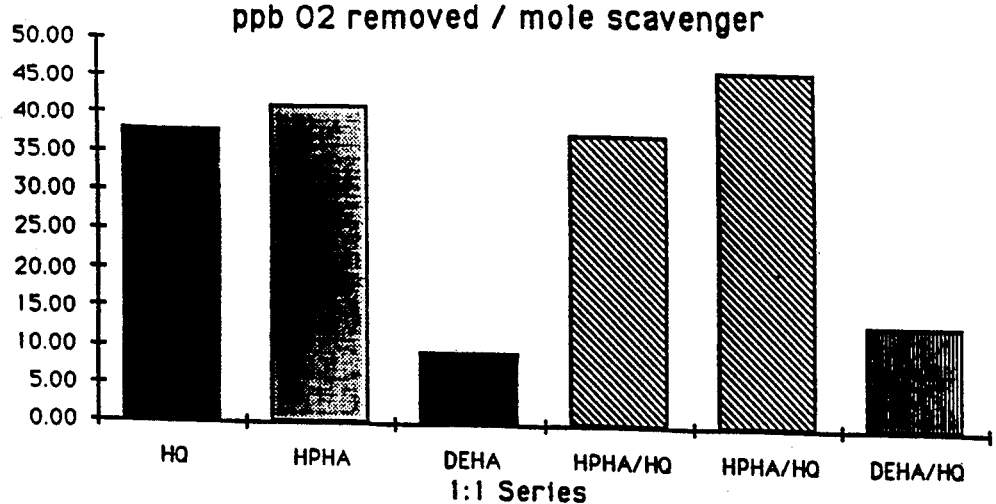
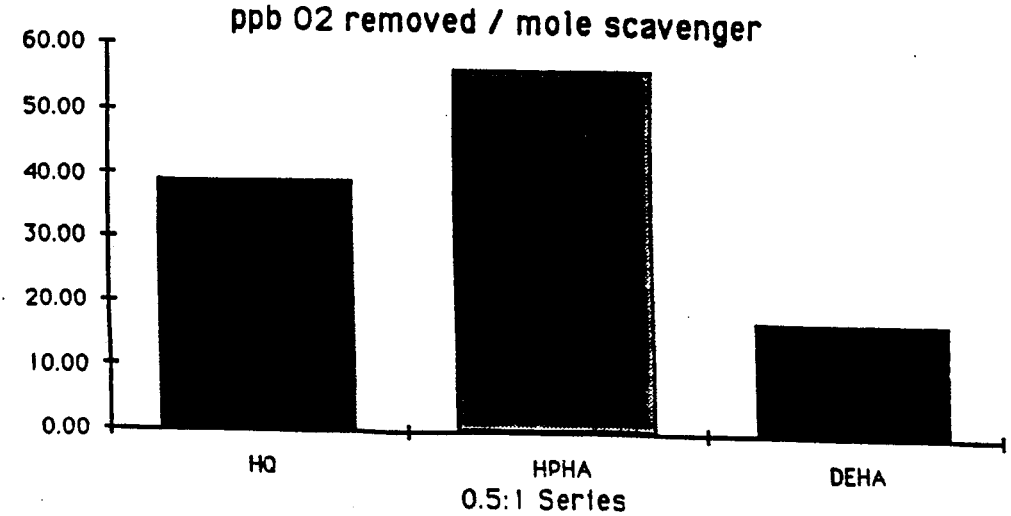

HYDROXYALKYLHYDROXYLAMINE OXYGEN SCAVENGER IN AQUEOUS MEDIUMS

This application is a continuation-in-part of U.S. Ser. No. 07/369,384 filed Jun. 21, 1989, now abandoned.

FIELD OF THE INVENTION

The present invention relates to oxygen scavengers for aqueous systems. More particularly, the present invention relates to the use of catalyzed and non-catalyzed hydroxyalkylhydroxylamines as oxygen scavengers in aqueous systems such as boiler systems.

BACKGROUND OF THE INVENTION

From a corrosion point of view, the presence of certain dissolved gases, even in small amounts, is undesirable in water systems which contact metal surfaces. For example, metal surfaces in contact with oxygen containing water can experience severe pitting in industrial water systems. Pitting is highly localized corrosion affecting only a small area of the total metal surface. This can be a serious problem causing metal failure even though only a small amount of metal is lost and the overall corrosion rate is relatively low.

With respect to oxygen, the severity of attack will depend upon the concentration of dissolved oxygen in the water, pH and temperature. As water temperature increases, as for example in a water heating system such as a boiler, enough driving force is added to the corrosion reaction that small amounts of dissolved oxygen in the water can cause serious problems. Oxygen pitting is considered a most serious problem in boiler systems, even where only trace amounts of oxygen are present.

Deaeration is a widely used method for removing oxygen from an oxygen-containing aqueous medium. It is particularly useful for treating boiler feedwater and can be either mechanical or chemical.

While vacuum deaeration has proven to be a useful mechanical deaeration method for treating water distributing systems, boiler feedwater is treated using pressure deaeration with steam as the purge gas. According to the pressure deaeration method for preparing boiler feedwater, the water is sprayed into a steam atmosphere and is heated to a temperature at which the solubility of oxygen in the water is low. Typically greater than 99% of the oxygen in the feedwater is released to the steam and is purged from the system by venting.

Mechanical deaeration is considered an important first step in removing dissolved oxygen from boiler feedwater. However, as already noted, as water temperature increases, even trace amounts of dissolved oxygen can cause serious problems. Accordingly, supplemental chemical deaeration is required.

For boilers operated below 1000 pounds per square inch (psi), catalyzed sodium sulfite is commonly used as an oxygen scavenger for the chemical deaeration of the feedwater. The oxygen/sulfite reaction can be effectively catalyzed by iron, copper, cobalt, nickel, and/or manganese. While the sodium sulfite oxygen scavenger is often used with success, this material does have recognized limitations. At boiler operating pressures of 900 to 1000 psi and above, increased dissolved solids from the sulfite/oxygen reaction product can become a significant problem. Also, at high pressures the sulfite decomposes in the boiler to form sulfur dioxide and hydrogen sulfide, both of which can cause corrosion in the return condensate system.

Hydrazine is also used as an oxygen scavenger. Hydrazine does not have the above noted high pressure limitation of sodium sulfite. For example, since the products of the hydrazine/oxygen reaction are water and nitrogen, no solids are added to the boiler water. Hydrazine as an oxygen scavenger does, however, have its own limitations. A major problem relates to the toxicity of hydrazine. Also, the hydrazine/oxygen reaction is very slow at low temperatures which may be encountered in some sections of a boiler system. The decomposition products of hydrazine are ammonia and nitrogen. The ammonia can be aggressive to copper or copper bearing metallurgies that are found in condensate systems.

In recent developments, the use of certain compounds such as dioxo-aromatic compounds or organically substituted derivatives thereof has become known. The group "dioxo-aromatic" consists of benzoquinone, napthoquinone, hydroquinone and catechol. The phrase "organically substituted derivatives thereof" includes any dioxo-aromatic compound having an organic substituent with a carbon atom attached directly to the aromatic ring. An example of such a derivative is 4-tert-butylcatechol. The use of quinones and diols as catalysts for the hydrazine/oxygen reaction in an aqueous medium is well known, for example, U.S. Pat. No. 3,551,349 to Kallfass. U.S. Pat. No. 3,843,547 to Kaufman discloses the use of a combination of an aryl amine compound and a quinone compound as a catalyst for a hydrazine oxygen scavenger.

Indeed, in the context of the prior art, wherein the use of quinones as catalysts for hydrazine/oxygen scavengers is well known, it was also discovered that some dioxo-aromatic compounds performed very well alone as oxygen scavengers. Such compounds are less toxic than hydrazine and also demonstrate greater reactivity at room temperature. The use of dioxo-aromatic compounds in combination with select neutralizing amines, classified as "mu-amines," is described in U.S. Pat. Nos. 4,279,767 and 4,289,645 to Muccitelli.

The use of hydroxylamine, certain of its water soluble salts and derivatives of hydroxylamine which serve as oxygen scavengers, is disclosed in U.S. Pat. No. 4,067,690. The hydroxylamines described as useful as oxygen scavengers have the general formula $R_1R_2NOR_3$ wherein R1, R2 and R3 are either the same or different and selected from the group consisting of hydrogen, lower alkyl having between 1 to about 8 carbon atoms, and aryl such as phenyl, benzyl, and tolyl. The hydroxylamine oxygen scavengers disclosed in U.S. Pat. No. 4,067,690 may be catalyzed with a number of well-known catalysts as used in sodium sulfite or hydrazine boiler water treatment such as hydroquinone and benzoquinone as well as alkaline metal hydroxides, and water soluble metal salts.

SUMMARY OF THE INVENTION

The present invention is directed to the discovery that hydroxylamines having hydroxyalkyl substitutions provide effective oxygen scavengers. The material may be catalyzed with a small amount of a hydroxylated aromatic compound or copper. The oxygen scavengers of the present invention have relatively high boiling points.

The present inventors have discovered that hydroxyalkylhydroxylamines are more effective oxygen scavengers than the prior art oxygen scavenger N,N-diethylhydroxylamine (DEHA) and similar alkyl hydroxylamines. As with the prior art oxygen scavengers, catalysts such as hydroquinone may be employed. The prior art problem of the low solubility of hydroquinone in aqueous mediums is minimized by the use of low concentrations of hydroquinone as a catalyst for the hydroxyalkylhydroxylamine oxygen scavenger of the present invention.

The preferred hydroxyalkylhydroxylamine of the present invention are N,N-bis(2-hydroxypropyl)hydroxylamine (HPHA), N,N-bis(2-hydroxyethyl)hydroxylamine (HEHA), and N,N-bis(2-hydroxybutyl)hydroxylamine (HBHA).

BRIEF DESCRIPTION OF THE DRAWINGS

FIG. 1 is a graph showing parts per billion oxygen removed for a variety of oxygen scavengers, 5:1 series.

FIG. 2 is a graph showing parts per billion oxygen removed for a variety of oxygen scavengers, 1:1 series.

FIG. 3 is a graph showing parts per billion oxygen removed for a variety of oxygen scavengers, 0.5:1 series.

DESCRIPTION OF THE PREFERRED EMBODIMENTS

The present inventors have discovered that hydroxyalkyl hydroxylamines either alone or catalyzed, provide improved oxygen scavenging under conditions encountered in a typical boiler system. The oxygen scavengers of the present invention combine low toxicity, are relatively easy to manufacture, and add no solids to the boiler system. They also provide good oxygen scavenging ability at typical deaerator temperatures and moderate reactivity at room temperatures which minimizes storage and handling problems.

The improved oxygen scavengers of the present invention comprise a hydroxyalkylhydroxylamine of the general formula HO—N—[CH$_2$—CH(OH)—R]$_2$ wherein R is H or C$_1$ to C$_{10}$ alkyl. A catalyst may be employed to accelerate the reaction of the hydroxyalkylhydroxylamine with oxygen to rates which are of practical use in low temperature areas of a boiler system or when reaction times are short. Catalyst which have been found to be effective include hydroxylated aromatics as well as copper. Preferred hydroxyalkylhydroxylamines include: N,N-bis(2-hydroxyethyl)hydroxylamine (n=0); N,N-bis(2-hydroxypropyl)hydroxylamine (n=1); and N,N-bis(2-hydroxybutyl)hydroxylamine (n=2). N,N-bis(2-hydroxypropyl)hydroxylamine is particularly preferred. Catalysts which have been found to be effective include hydroquinone, benzoquinone, pyrogallol, copper and 1,2-naphthoquinone-4-sulfonic acid. 1,2-naphthoquinone-4-sulfonic acid has been found to be particularly effective.

The hydroxyalkylhydroxylamine of the present invention can be added to an aqueous system in amounts ranging from about 5 parts per billion up to about 100 parts per million. Preferably the hydroxyalkylhydroxylamine is added to an aqueous system in concentrations ranging from about 5 up to about 200 parts per billion. The percentage of catalyst can range from 0 up to about 25% catalyst.

The effectiveness of the hydroxyalkylhydroxylamine oxygen scavengers of the present invention is evidenced by the following examples wherein oxygen scavenging ability was tested at both room temperature and at temperatures corresponding to those expected in a typical boiler system deaerator. The present invention will now be further described with reference to a number of specific examples which are to be regarded as illustrative and not as restricting the scope of the invention.

Test Method Utilized

The testing at room temperature was performed using a room temperature oxygen scavenging apparatus which consists of a three necked flask fitted with a dissolved oxygen electrode in one neck, a pH electrode in a second neck, and a rubber septum at a third neck. Aerated, demineralized water in the flask was adjusted to a fixed pH with sodium hydroxide and held at an equilibrium temperature fixed by a water bath surrounding the flask. Following injection of a scavenger/catalyst mixture through the rubber septum, the dissolved oxygen concentration was recorded as a function of time. The numbers shown in the following tables are based upon the initial rates of reaction for each scavenger with dissolved oxygen. The rate is measured by the slope of the plot of log (oxygen concentration at a given time divided by initial oxygen concentration) versus the time in minutes. Because the rate of oxygen removal is measured, larger negative values indicate faster, more desirable reaction rates.

Test Conditions for Tables 1, 2 and 3
Temperature: 28° C. (83° F.)
pH: 10.0
pH adjustment with 1N NAOH
Water: Air saturated, demineralized
Scavenger Concentration: $6.3 \times 10^{-4}$ molar
Organic Catalyst Concentration: $5.1 \times 10^{-5}$ molar

TABLE 1

| Initial Reaction Rates of HPHA/Catalyst Combination | |
|---|---|
| Treatment | Rate |
| HPHA alone, no catalyst | −0.003 |
| HPHA/hydroquinone | −0.619 |
| HPHA/1,2-naphthoquinone-4-sulfonic acid | −0.786 |
| HPHA/benzoquinone | −0.569 |
| HPHA/copper (II)* | −0.260 |
| HPHA/pyrogallol | −0.204 |
| HPHA/t-butylcatechol | −0.062 |

*copper was tested at 2 ppm in combination with 3.6 ppm hydroxyethylidenediphosphonic acid.

TABLE 2

| Reaction Rates for the Series n = 0 to 2, N,N-bis(2-hydroxyalkyl)hydroxylamines with Hydroquinone Catalyst | |
|---|---|
| Treatment | Reaction Rate |
| HEHA/no catalyst | −0.002 |
| HEHA/HQ | −0.337 |
| HPHA/no catalyst | −0.003 |
| HPHA/HQ | −0.619 |
| HBHA no catalyst | −0.002 |
| HBHA/HQ | −0.550 |

TABLE 3

| Initial Reaction Rates of Various Hydroxylamine/Catalyst Combinations | |
|---|---|
| Treatment | Rate |
| Diethylhydroxylamine/hydroquinone | −0.215 |
| Hydroxyethylhydroxylamine/hydroquinone | −0.354 |
| Dipropylhydroxylamine/hydroquinone | −0.163 |
| Hydroxypropylhydroxylamine/hydroquinone | −0.619 |
| Dibutylhydroxylamine/hydroquinone | −0.162* |
| Hydroxybutylhydroxylamine/hydroquinone | −0.426** |
| Hydroxybutylhydroxylamine/hydroquinone | −0.550*** |

*Stock prepared in ethanol due to low aqueous solubility.
**Stock prepared in ethanol.
***Stock prepared in water.

The data in Tables 1, 2, and 3 shows the desirability of a catalyst when the reaction temperatures are low. The significantly higher rate of reaction of the hydroxyalkylhydroxylamines with dissolved oxygen when compared to their non-hydroxylated alkyl analogs was unexpected.

Experiments which approximate typical deaerator conditions were run in a moderate temperature scavenging test apparatus similar to those described in U.S. Pat. No. 4,289,645 incorporated herein by reference.

Test Conditions for Table 4 and 5
Temperature: 135° C. (275° F.)
pH: (25° C.): 8.0
Residence Time at 275° F.: 6 min.
Flow Rate: 167 mL/min.
Initial dissolved oxygen: 30+/−4 parts per billion
Reaction coil: 40 ft × ⅓ in 316 stainless steel tube
Total time in system: 9 minutes
pH buffer: 1,059 ppm $KH_2PO_4$/286 ppm NaOH
Buffer injection rate: 2.0+/−0.2 mL/min into 167 mL/min
Catalyst concentration: $6.7 \times 10^{-8}$ molar
Scavenger concentration: $8.3 \times 10^{-7}$ molar

TABLE 4

HPHA Testing in Moderate Temperature Oxygen Scavenging Test Apparatus

| Scav | Catalyst | O2/ w/out Scav | O2/ with Scav | O2 Removed ppb |
|---|---|---|---|---|
| DEHA | None | 31.0 | 25.5 | 4.5 |
| HPHA | None | 31.0 | 14.0 | 17.0 |
| HPHA | HQ | 31.5 | 10.0 | 21.5 |
| HPHA | HQ | 26.0 | 4.0 | 22.0 |
| HPHA | NS | 29.8 | 5.0 | 24.8 |
| HPHA | PYRO | 29.3 | 4.0 | 25.3 |
| HPHA | PG | 30.0 | 4.4 | 26.0 |
| HPHA | PG | 28.0 | 7.5 | 20.5 |

(HQ = hydroquinone, NS = 1,2-naphthoquinone-4-sulfonic acid, PYRO = pyrogallol and PG = propyl gallate)

The data in Table 4 shows that even at elevated temperatures, the non-hydroxylated hydroxylamine, DEHA, has little activity without a catalyst present. Conversely, HPHA, a hydroxylamine with hydroxylated alkyl substituent, shows good oxygen scavenging reactivity with or without the presence of a catalyst.

TABLE 5

Hydroxylamine Testing in Moderate Temperature Oxygen Scavenging Test Apparatus

| Scav | Catalyst | O2/ w/out Scav | O2/ with Scav | O2 Removed ppb |
|---|---|---|---|---|
| DEHA | HQ | 27.0 | 12.0 | 15.0 |
| DEHA | HQ | 32.0 | 16.0 | 16.0 |
| HEHA | HQ | 30.5 | 10.0 | 20.5 |
| DPHA | HQ | 32.0 | 20.0 | 12.0 |
| HPHA | HQ | 26.0 | 4.0 | 22.0 |
| HPHA | HQ | 31.5 | 10.0 | 21.5 |
| DBHA | HQ | 30.5 | 19.0 | 11.5 |
| HBHA | HQ | 30.0 | 3.5 | 26.5 |

Tables 4 and 5 illustrate the superior reactivity of the hydroxylamines having hydroxylated alkyl substituents over the analogous non-hydroxylated materials, even at elevated temperatures.

A field evaluation was conducted at an operating cogeneration plant in a paper mill to compare the oxygen scavenging effectiveness of hydroquinone (HQ), hydroxypropylhydroxylamine (HPHA), diethylhydroxylamine (DEHA) and HQ catalyzed versions of HPHA and the DEHA. The 600 pound per square inch boiler provided steam to a gas turbine and to an extraction turbine. The condensate system included copper metallurgy which resulted in a copper concentration in the deaerator during the trial which ranged from 5 to 15 parts per billion and averaged 7.9 parts per billion. Evaluations were made at three approximately equal weight concentrations of scavenger to oxygen concentration of 5:1, 3:1, and 0.5:1. The ratios refer to a given molar stoichiometry of hydroquinone, with the other materials fed at the same rate. Thus, for each ratio the molar stoichiometry of hydroquinone for the amount of oxygen present was calculated and the feed rate of hydroquinone in parts per million was determined. The other scavengers were then fed at the same weight-based concentration. FIGS. 1, 2 and 3 showed the parts per billion of oxygen removed per mole of scavenger (Y axis) for the tested materials (X axis) at these ratios. As can be seen, at these test conditions, in an operating boiler system the HPHA of the present invention (either catalyzed or uncatalyzed) was significantly more effective than the prior art HQ or DEHA at removing oxygen. The increased effectiveness of the HPHA is less noticeable at the 5 to 1 ratio where an excess of oxygen scavenger is fed than at the 1 to 1 and 0.5 to 1 ratios which are more representative of the preferred feed rates of the present invention.

As can be seen in all the Figures and Tables, in all cases the hydroxyalkylhydroxylamines are significantly more effective than the non-hydroxylated hydroxylamines. The effect is found at both room temperature and at deaerator temperatures in a boiler system.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

What is claimed is:

1. A method of reducing the amount of oxygen in an oxygen containing aqueous medium comprising adding to said oxygen containing aqueous system a hydroxyalkylhydroxylamine having the formula HO—N—$CH_2$—[CH(OH)—R]$_2$ wherein R is selected from the group consisting of H and $C_1$ to $C_{10}$ alkyl; wherein the initial rate of reaction between said hydroxyalkylhydroxylamine and dissolved oxygen is more than about 1.5 times the initial rate of reaction between dissolved oxygen and the corresponding non-hydroxylated alkylhydroxylamine.

2. The method of claim 1 wherein said hydroxyalkylhydroxylamine is selected from the group consisting of N,N,-bis (2-hydroxyethyl) hydroxylamine, N,N-bis(2-hydroxypropyl) hydroxylamine, and N,N-bis(2-hydroxybutyl) hydroxylamine.

3. The method of claim 1 wherein said hydroxyalkylhydroxylamine is added to said aqueous medium in an amount of from about 5 parts per billion up to about 100 parts per million.

4. A method of reducing the amount of oxygen in an oxygen containing aqueous medium comprising adding to said oxygen containing medium an aqueous solution comprising (A) a hydroxyalkylhydroxylamine having the formula HO—N—[$CH_2$—CH(OH)—R]$_2$ wherein R is selected from the group consisting of H and $C_1$ to $C_{10}$ alkyl; wherein the initial rate of reaction between said hydroxyalkylhydroxylamine and dissolved oxygen is more than about 1.5 times the initial rate of reaction between dissolved oxygen and the corresponding non-hydroxylated alkylhydroxylamine and (B) a catalyst selected from the group consisting of copper, hydroquinone, benzoquinone, 1,2-naphthoquinone-4-sulfonic acid, pyrogallol, and t-butylcatechol.

5. The method of claim 4 wherein said hydroxyalkylhydroxylamine is selected from the group consisting of N,N,-bis-(2-hydroxyethyl) hydroxylamine, N,N-bis(2-hydroxypropyl) hydroxylamine, and N,N-bis(2-hydroxybutyl) hydroxylamine.

6. The method of claim 4 wherein the percentage of catalyst ranges from a trace up to about 25% catalyst.

7. A method of reducing the amount of dissolved oxygen in an aqueous boiler water system having up to about 50 parts per billion dissolved oxygen which comprises adding to said aqueous system an aqueous solution of hydroxyalkylhydroxylamine having the formula HO—N—CH$_2$—[CH(OH)—R]$_2$ wherein R is selected from the group consisting of H and C$_1$ to C$_{10}$ alkyl; wherein the initial rate of reaction between said hydroxyalkylhydroxylamine and dissolved oxygen is more than about 1.5 times the initial rate of reaction between dissolved oxygen and the corresponding non-hydroxylated alkylhydroxylamine; said aqueous solution of hydroxyalkylhydroxylamine is added to said system in amounts of from about 5 parts per billion up to about 100 parts per million.

8. The method of claim 7 wherein said aqueous solution of hydroxyalkylhydroxyalmine also includes a catalyst selected from the group consisting of copper, hydroquinone, benzoquinone, 1,2-naphthoquinone-4-sulfonic acid, pyrogallol, and t-butylcatechol.

9. The method of claim 8 wherein the percentage of catalyst ranges from a trace up to about 25%.

10. The method of claim 7 wherein said hydroxyalkylhydroxylamine is selected from the group consisting of N,N,-bis-(2-hydroxyethyl) hydroxylamine, N,N-bis(2-hydroxypropyl) hydroxylamine, and N,N-bis(2-hydroxybutyl) hydroxylamine.

* * * * *

UNITED STATES PATENT AND TRADEMARK OFFICE
CERTIFICATE OF CORRECTION

PATENT NO. : 5,256,311

DATED : Oct. 26, 1993

INVENTOR(S) : Anthony M. Rossi; Paul R. Burgmayer

It is certified that error appears in the above-identified patent and that said Letters Patent is hereby corrected as shown below:

At Column 6, lines 44-45 and at Column 7, line 19, please delete "HO-N-CH$_2$-[CH(OH)-R]$_2$" and substitute therefor ---HO-N-[CH$_2$-CH(OH)-R]$_2$---

Signed and Sealed this

Twelfth Day of July, 1994

BRUCE LEHMAN

*Attest:*

*Attesting Officer*   *Commissioner of Patents and Trademarks*